United States Patent
Weaver et al.

(10) Patent No.: US 10,429,857 B2
(45) Date of Patent: Oct. 1, 2019

(54) AIRCRAFT REFUELING WITH SUN GLARE PREVENTION

(71) Applicant: The Boeing Company, Chicago, IL (US)

(72) Inventors: Thomas L. Weaver, Webster Groves, MO (US); Donald Frank Wilkins, O'Fallon, MO (US)

(73) Assignee: The Boeing Company, Chicago, IL (US)

(*) Notice: Subject to any disclaimer, the term of this patent is extended or adjusted under 35 U.S.C. 154(b) by 428 days.

(21) Appl. No.: 15/411,890

(22) Filed: Jan. 20, 2017

(65) Prior Publication Data

US 2018/0210466 A1  Jul. 26, 2018

(51) Int. Cl.
| | | |
|---|---|---|
| *G05D 1/10* | (2006.01) | |
| *B64D 39/00* | (2006.01) | |
| *G08G 5/00* | (2006.01) | |
| *B64C 39/02* | (2006.01) | |

(52) U.S. Cl.
CPC .......... *G05D 1/104* (2013.01); *B64C 39/024* (2013.01); *B64D 39/00* (2013.01); *G08G 5/00* (2013.01); *B64C 2201/063* (2013.01); *B64C 2201/146* (2013.01)

(58) Field of Classification Search
CPC .................. G05D 1/104; B64C 39/024; B64C 2201/063; B64C 2201/146; G08G 5/00; B64D 39/00
See application file for complete search history.

(56) References Cited

U.S. PATENT DOCUMENTS

| | | | |
|---|---|---|---|
| 6,960,750 B2* | 11/2005 | Doane | G02B 5/124 244/135 A |
| 7,458,543 B2 | 12/2008 | Cutler et al. | |
| 8,843,301 B2* | 9/2014 | Spinelli | G05D 1/104 244/135 A |
| 2010/0217526 A1* | 8/2010 | McElveen | B64D 39/00 701/300 |
| 2014/0049640 A1* | 2/2014 | Shishalov | G08B 17/005 348/143 |
| 2015/0088373 A1 | 3/2015 | Wilkins | |
| 2015/0293225 A1* | 10/2015 | Riley | G05D 1/0684 356/4.01 |

OTHER PUBLICATIONS

Ibrahim Reda et al. Solar Position Algorithm for Solar Radiation Applications; Technical Report; National Renewable Energy Laboratory; NREL/TP-560-34302; Jan. 2008.

* cited by examiner

*Primary Examiner* — Michael J Zanelli
(74) *Attorney, Agent, or Firm* — Duft & Bornsen, PC

(57) ABSTRACT

Systems and methods for aircraft refueling with sun glare prevention. One embodiment is a method that includes calculating a future time to position a receiver aircraft via an optical sensor with respect to a supply aircraft for an aerial fuel transfer, and calculating a sun position relative to the position of the receiver aircraft for the future time. The method also includes determining that the optical sensor of the receiver aircraft is susceptible to solar interference for the future time based on the sun position relative to the position of the receiver aircraft. The method further includes generating a request for the supply aircraft to move to an alternate position for the future time, and positioning the receiver aircraft via the optical sensor at the future time with respect to the alternate position of the supply aircraft for the aerial fuel transfer.

20 Claims, 5 Drawing Sheets

AIRCRAFT REFUELING WITH SUN GLARE PREVENTION

FIELD

The disclosure relates to aircrafts, and in particular, to refueling an aircraft.

BACKGROUND

Aerial refueling is a transfer of fuel from one aircraft to another during flight. Typically, a supply aircraft carrying fuel travels along a relatively steady flight path as a receiver aircraft connects via a hose or boom that delivers the fuel. For example, the supply aircraft may be a tanker that flies in a preplanned orbit or flight path, so that a fleet of Unmanned Aerial Vehicles (UAVs) may refuel as needed to extend flight missions. When a UAV is low on fuel, it may return to the tanker by intercepting its flight path and establishing a connection with the tanker for approximately twenty to thirty minutes for refueling.

The receiver aircraft, or UAV, may be equipped with light-sensitive optical sensors that capture image data and enable autopilot of the receiver aircraft. In a typical automated aerial refuel operation, an optical sensor is directed upward to detect the supply aircraft above as the receiver aircraft positions underneath for refueling. Since the receiver aircraft's fueling position tends to be constrained by the supply aircraft's flight path, the position/direction of the optical sensor is also limited during the approach and physical connection of the aircrafts. Sometimes, the supply aircraft's position forces the receiver aircraft's optical sensor to be exposed to the sun at an angle which blinds the optical sensor and renders it inoperable for an extended period of time (e.g., minutes to hours). If the optical sensor used for refueling becomes blinded, the receiver aircraft may be forced to cancel its mission and return to base using its remaining fuel or risk becoming lost.

SUMMARY

Embodiments herein describe aircraft refueling with sun glare prevention. A receiver aircraft is equipped with an optical sensor for performing an automated aerial refueling operation with a supply aircraft. The supply aircraft's planned flight path may be extrapolated to determine a location of the supply aircraft at a future time for refueling. The location of the supply aircraft for refueling may define an allowable range of locations for the receiver aircraft to be positioned in for refueling at the future time. By calculating a precise relative position between the receiver aircraft and the sun at the future time, a risk of the optical sensor becoming inoperable due to solar blindness may be predicted, and the orientation of the supply aircraft may be altered so that the receiver aircraft may complete the refueling procedure without the risk of solar blindness at the optical sensor.

One embodiment is a method that includes calculating a future time to position a receiver aircraft via an optical sensor with respect to a supply aircraft for an aerial fuel transfer, and calculating a sun position relative to the position of the receiver aircraft for the future time. The method also includes determining that the optical sensor of the receiver aircraft is susceptible to solar interference for the future time based on the sun position relative to the position of the receiver aircraft. The method further includes generating a request for the supply aircraft to move to an alternate position for the future time, and positioning the receiver aircraft via the optical sensor at the future time with respect to the alternate position of the supply aircraft for the aerial fuel transfer.

Another embodiment is a system that includes a supply aircraft and a processor. The supply aircraft is configured to receive instructions that indicate a flight path for the supply aircraft to follow, and to transfer fuel in-flight to an unmanned air vehicle in an aerial refuel operation. The processor is configured to determine that the flight path exposes an optical sensor of the unmanned air vehicle to solar interference during the aerial refuel operation based on a calculation of a sun position relative to the unmanned air vehicle for the flight path, and to generate a message to display at the supply aircraft an indication to adjust the flight path for the aerial refuel operation.

Other exemplary embodiments (e.g., methods, systems, and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
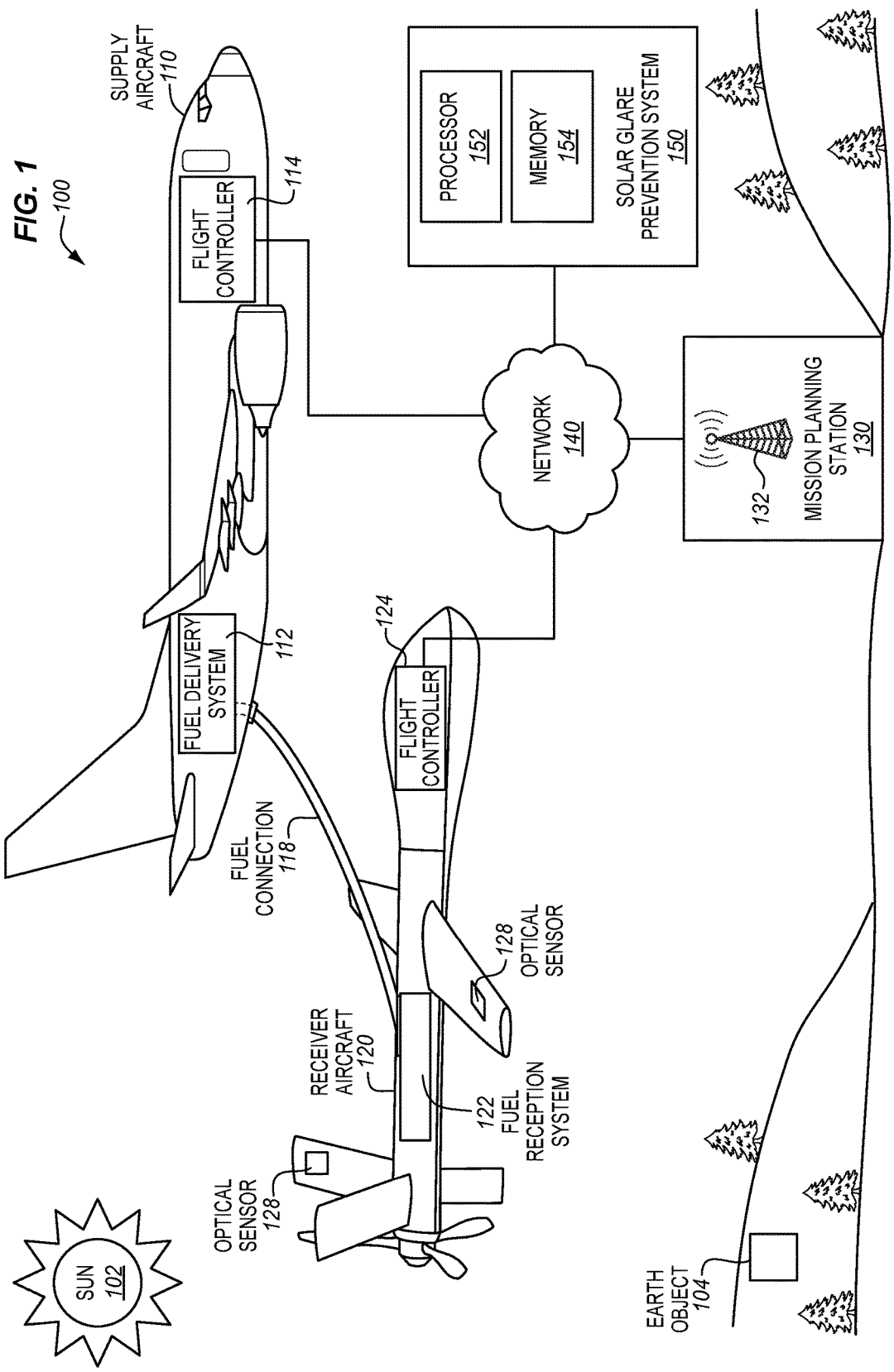
FIG. 1 illustrates an aerial refueling system in an exemplary embodiment.

FIG. 1 illustrates an aerial refueling system 100 in an exemplary embodiment. Aerial refueling system 100 includes one or more supply aircraft(s) 110, receiver aircraft(s) 120, mission planning station(s) 130, and network(s) 140. In an aerial refueling operation, fuel is transferred from supply aircraft 110 to receiver aircraft 120 in-flight. The refueling operation may be coordinated by mission planning station 130 which communicates flight data and commands over network 140.

Supply aircraft 110 is any aircraft capable of providing fuel to another aircraft in-flight. Supply aircraft 110 includes a fuel delivery system 112 for storing/transferring fuel, and flight controller 114 for managing overall flight operation of supply aircraft 110. Supply aircraft 110 may be operated manned or unmanned as desired. In one example, supply aircraft 110 may comprise a tanker that flies in a predetermined flight path according to a mission plan managed by mission planning station 130.

Receiver aircraft 120 is any aircraft capable of receiving fuel from another aircraft in-flight. Receiver aircraft 120 includes a fuel reception system 122 for receiving/storing fuel, flight controller 124 for managing overall flight operation of receiver aircraft 120, and one or more optical sensors 128 for obtaining image data of the surrounding environment. Receiver aircraft 120 may be operated manned or unmanned as desired. In one example, receiver aircraft 120 may comprise an unmanned aerial vehicle (UAV) assigned and/or directed to a supply aircraft 110 for refueling according to a mission plan managed by mission planning station 130.

During a flight mission, receiver aircraft 120 may autonomously maneuver in an autopilot mode based on image data obtained by optical sensors 128. As such, flight controller 124 may control optical sensors 128 to obtain image data, and process the image data to detect objects and determine maneuver commands. For instance, flight controller 124 may use optical sensors 128 to detect earth object(s) 104 on the ground (e.g., buildings, vehicles, terrain features, etc.) or objects in the sky (e.g., other aircrafts in-flight such as supply aircraft 110). Flight controller 124 may also determine additional characteristics of an object by processing image data of optical sensors 128, such as size, speed, heading, and/or other similar information for tracking objects.

In an aerial refueling operation, flight controller 124 may use one or more optical sensors 128 to approach supply aircraft 110 and establish/maintain a fuel connection 118 that physically couples receiver aircraft 120 to supply aircraft 110 for refueling. However, the relative positions of supply aircraft 110, receiver aircraft 120, and optical sensors 128 for a refueling operation may force optical sensors 128 to be exposed to the sun 102 at a harmful angle. Since optical sensors 128 may include light-sensitive components for collecting image data, sun glare at certain angles may blind optical sensors 128 and disable their operation for a period of time ranging from minutes to hours. Solar blindness of optical sensors 128 may hinder the refueling operation and cause receiver aircraft 120 to cancel its mission and land using its remaining fuel or risk becoming lost.

Aerial refueling system 100 is therefore enhanced with solar glare prevention system 150 which is any combination of systems, devices, or components operable to anticipate a risk of solar interruption at optical sensors 128 during an aerial refuel operation, and to direct a change in flight path that avoids the solar interruption. As will be described in greater detail below, solar glare prevention system 150 may predict solar interruption at optical sensors 128 with a high degree of accuracy even at early planning stages of a flight mission to assist manned and unmanned aircrafts avoid solar interruption during an aerial refuel operation.

Solar glare prevention system 150 may be implemented in mission planning station 130, supply aircraft 110, receiver aircraft 120, as a separate system (as shown), or some combination thereof. While the specific hardware implementation of solar glare prevention system 150 is subject to design choices, one particular embodiment may include one or more processors 152 coupled with a memory 154. Processor 152 includes any hardware device that is able to perform functions. Processor 152 may include one or more Central Processing Units (CPU), microprocessors, Digital Signal Processors (DSPs), Application-specific Integrated Circuits (ASICs), etc. Some examples of processors include Intel® Core™ processors, Advanced Reduced Instruction Set Computing (RISC) Machines (ARM®) processors, etc. Memory 154 includes any hardware device that is able to store data. Memory 154 may include one or more volatile or non-volatile Dynamic Random Access Memory (DRAM) devices, FLASH devices, volatile or non-volatile Static RAM devices, hard drives, Solid State Disks (SSDs), etc. Some examples of non-volatile DRAM and SRAM include battery-backed DRAM and battery-backed SRAM.

Mission planning station 130 is any combination of systems, devices, or components operable to remotely manage flight operations of supply aircraft(s) 110 and/or receiver aircraft(s) 120. Mission planning station 130 includes transceiver 132 operable to send/receive flight data to/from flight controllers 114/124 of aircrafts 110/120 over network 140. Network 140 is any suitable combination of wired and wireless communication mediums (e.g., radio frequency (RF) network, satellite network, local area network (LAN), etc.). Accordingly, aircrafts 110/120 (and/or respective flight controllers 114/124) and/or solar glare prevention system 150 may each include communication circuitry, antennas, and/or any other suitable communication components compatible with network 140 to exchange flight data (e.g., aircraft position data, aircraft fuel data, image data, etc.) with mission planning station 130 and/or each other. Mission planning station 130 may also remotely command aircrafts 110/120 over network 140 with maneuver commands, refuel commands, or other types of commands as it directs an overall mission plan for aircrafts 110/120 under its management. Mission planning station 130 may be implemented, for example, as a ground system operated by an airport, military unit, or other entity that manages a fleet of receiver aircrafts 120 assigned to supply aircraft 110 for aerial refueling operations.

Optical sensors 128 may include cameras, video cameras, infrared (IR) sensors, laser detection and ranging (Lidar) sensors, or other imaging systems/devices operable to capture image data. In this manner, each optical sensor 128 may convert light (e.g., visible light spectrum, infrared spectrum, or ultraviolet spectrum) into electronic signals to generate still or video images in a two or three dimensional representation of space outside receiver aircraft 120. Optical sensors 128 may be communicatively coupled with an image processor (e.g., implemented with optical sensors 128, flight controller 124, and/or solar glare prevention system 150) that receives real-time or buffered image data and processes the image data to detect airborne targets such as supply aircraft 110 and/or particular components thereof such as fuel delivery system 112, fuel connection 118, etc. Fuel connection 118 may include a boom, hose, or other device that connects fuel delivery system 112 and fuel reception system 122 for the transfer of fuel that powers the flight of receiver aircraft 120.

In an automated (e.g., aircraft maneuvering without pilot or remote operator input) or semi-automated (e.g., aircraft maneuvering in conjunction with pilot or remote operator input) refuel operation, flight controller 124 may use optical sensors 128 to maneuver receiver aircraft 120 to approach supply aircraft 110 and to align/connect fuel reception system 122 with fuel delivery system 112 and/or fuel connection 118. Fuel connection 118, fuel delivery system 112, and/or fuel reception system 122 may call for a particular refueling position of receiver aircraft 120 with respect to supply aircraft 110 (e.g., a range of allowable distances/angles between aircrafts 110/120 for refueling). Optical sensors 128 may be configured in a variety of positions and combinations to accommodate the relative refueling position(s) of aircrafts 110/120. For example, in embodiments in which fuel reception system 122 of receiver aircraft 120 is a distance below fuel delivery system 112 of supply aircraft 110 while fuel connection 118 is established, at least one optical sensor 128 mounted on the body of receiver aircraft 120 may be directed in an upward direction for detecting supply aircraft 110 above as receiver aircraft 120 approaches from below prior to establishing fuel connection 118. However, receiver aircraft 120 may approach/connect to supply aircraft 110 for refueling at alternative relative directions, angles, etc., and embodiments described herein may also apply to alternative positions/directions of optical sensors 128 as well as relative angles/positions of supply aircraft 110, receiver aircraft 110, and the sun 102 (e.g., depending on time of day). Alternatively or additionally, flight controller 114 of supply aircraft 110 may use image data from optical sensors 128 mounted on supply aircraft 110 for positioning fuel delivery system 112 and/or fuel connection 118 with respect to fuel reception system 122 of receiver aircraft 120.

Aerial refueling system 100 as shown and described herein is exemplary for purposes of illustration and therefore alternative arrangements and configurations of components are possible. Aerial refueling system 100 and components thereof may also include additional systems, device, and components not shown for ease of illustration. For instance, supply aircraft 110 and/or receiver aircraft 120 may include position sensors for determining a rotational orientation of aircrafts 110/120, a global positioning system (GPS) for determining a coordinate location of aircrafts 110/120 (e.g., latitude, longitude, elevation), and/or a graphical user interface (GUI) for displaying data and receiving selection input by flight crew members in manned aircraft embodiments. Additional details of operation of solar glare prevention system 150 are described below.

Figure 2:
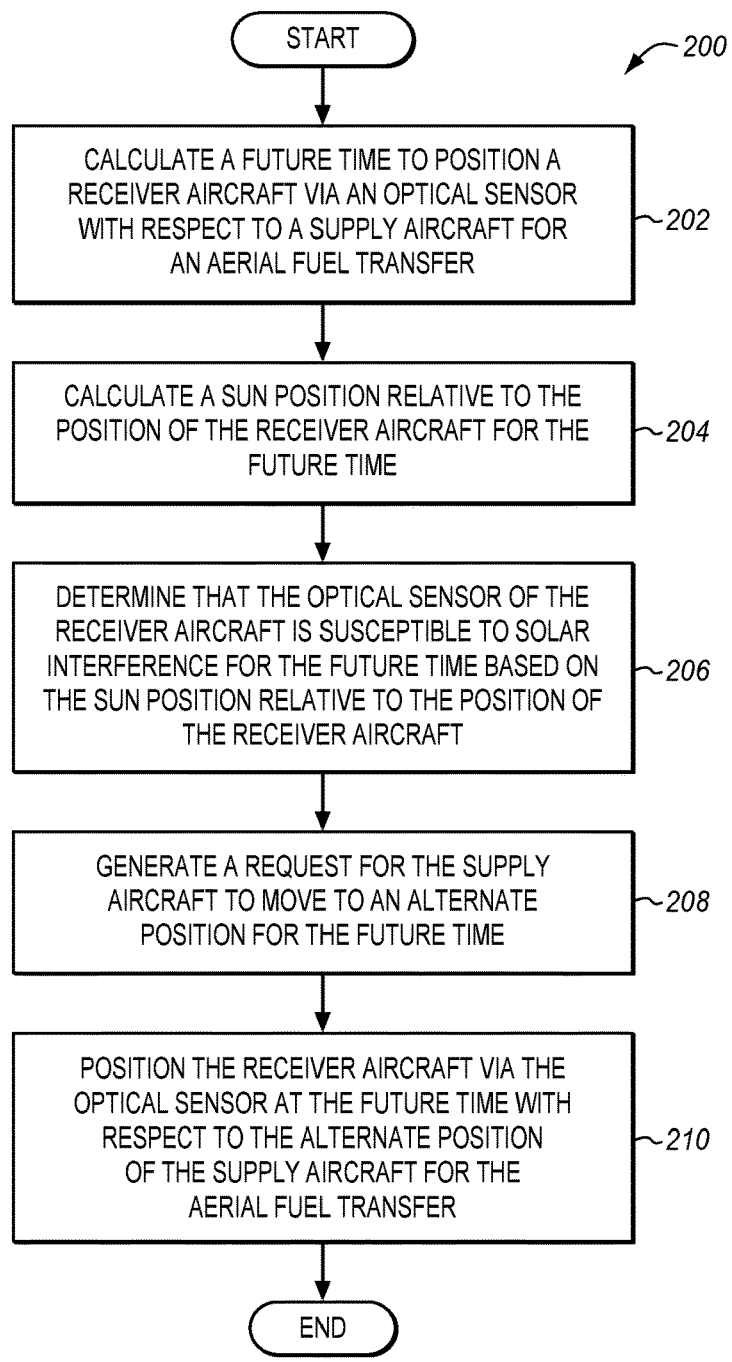
FIG. 2 is a flowchart of a method for preventing solar glare for an aerial refuel operation in an exemplary embodiment.

FIG. 2 is a flowchart of a method 200 for preventing solar glare for an aerial refuel operation in an exemplary embodiment. The steps of method 200 will be described with reference to FIG. 1, but those skilled in the art will appreciate that method 200 may be performed in other systems. The steps of the flowchart(s) described herein are not all inclusive and may include other steps not shown. The steps described herein may also be performed in an alternative order.

In step 202, processor 152 calculates a future time to position receiver aircraft 120 via one or more optical sensor(s) 128 with respect to supply aircraft 110 for an aerial fuel transfer. The future time may relate to a time of day during which optical sensors 128 are to be used for maneuvering receiver aircraft 120 for coupling with supply aircraft 110 via fuel connection 118. The term coupling as used herein may include the approach/alignment of receiver aircraft 120 using image data of optical sensors 128 prior to establishing fuel connection 118. Alternatively or additionally, the term coupling as used herein may refer to the process of establishing/maintaining fuel connection 118 (e.g., the physical coupling of aircrafts 110/120) via optical sensors 128 for the aerial fuel transfer.

The future time for positioning receiver aircraft 120 using optical sensors 128 may be defined by a time for initiating use of optical sensors 128 for tracking supply aircraft 110 for the aerial fuel transfer and a time for completing the aerial fuel transfer. Processor 152 may calculate the time for initiating use of optical sensors 128 based on a time of day for initiating the refuel operation and a duration of time for receiver aircraft 120 to travel to an approximate location of supply aircraft 110 without use of optical sensors 128 for fuel positioning (e.g., based on GPS coordinates of aircrafts 110/120). Once receiver aircraft 120 is within a sufficient proximity to supply aircraft 110 (e.g., depending on range of optical sensor 128, weather conditions, etc.), flight controller 124 may initiate use of optical sensors 128 for the refuel operation.

The refuel operation may be initiated based on, for example, a determination by flight controller 124 or mission planning station 130 that a fuel level of receiver aircraft 120 is below a threshold, a command sent by mission planning station 130 to receiver aircraft 120 to refuel or return to supply aircraft 110, a queue for refueling at supply aircraft 110, or a scheduled refuel time indicated in a mission plan that coordinates operation of multiple receiver aircrafts 120. To harmonize refueling operations for several deployed receiver aircrafts 120, mission planning station 130 may advantageously instruct supply aircraft 110 to fly according to a flight path that defines or maps a location of supply aircraft 110 over time according to predetermined flight parameters. For instance, the flight path may plot an orbit of supply aircraft 110 at a particular elevation and velocity. Processor 152 may analyze/extrapolate the flight path of supply aircraft 110 to determine the time for initiating use of optical sensors 128 for positioning receiver aircraft 120 for an automated fuel operation.

In other words, processor 152 may determine a future time of day for initiating optical sensors 128 for the refuel operation by calculating a time for receiver aircraft 110 to converge toward a flight path trajectory of supply aircraft 110 such that is within sufficient range of supply aircraft 110 to detect with optical sensors 128 used in for refuel operations. In this calculation, processor 152 may take into account a relative distance (e.g., GPS coordinates of aircrafts 110/120 at initiating the refuel operation), velocity, and/or acceleration projected for aircrafts 110/120, as well as any environment factors that may impact the traveling time of aircrafts 110/120, such as a fuel level of receiver aircraft 120, wind patterns, etc.

Processor 152 may determine a future time of day for completing the aerial fuel transfer by calculating a duration of time for coupling aircrafts 110/120 via fuel connection 118, including the time for approaching, aligning, connecting, and/or maintaining fuel connection 118. Processor 152 may determine a refuel completion time based on approach technique/parameters of flight controller 124 to establish fuel connection 118, refueling parameters of fuel delivery system 112 and/or fuel reception system 122 (e.g., transfer rate, storage capacity, etc.), a fuel level of receiver aircraft 120, etc. Processor 152 may thus advantageously determine the future time to position receiver aircraft 120 via one or more optical sensor(s) 128 based on a calculated span of time between initiating use of optical sensors 128 for the aerial fuel transfer and ending use of optical sensors 128 for the aerial fuel transfer.

In step 204, processor 152 calculates a sun position relative to the position of receiver aircraft 120 for the future time. Processor 152 may calculate the sun position relative to the position of receiver aircraft 120 by determining, at the time of interest (e.g., determined in step 202), the position of the earth with respect to the sun 102 from astronomical tables, and converting that position into a position for the sun 102 as seen by an observer at receiver aircraft 120. Processor 152 may also advantageously calculate the position of receiver aircraft 120 for the future time based on a positional constraint for connecting receiver aircraft 120 with supply aircraft 110 for the aerial fuel transfer. In other words, processor 152 may store/receive refueling position information of receiver aircraft 120 and/or supply aircraft 110 that defines a range of potential distances/angles between aircrafts 110/120 during approach/connection for a refuel operation. Alternatively or additionally, processor 152 may use positional information of aircrafts 110/120 determined for the future time (e.g., calculated in step 202) to calculate a range of potential distances/angles between aircrafts 110/120 during approach/connection for a refuel operation. Additional details regarding techniques for calculating a highly precise relative position of the sun and receiver aircraft 120 is described in greater detail below.

In step 206, processor 152 determines that optical sensor 128 of receiver aircraft 120 is susceptible to solar interference at the future time based on the sun position relative to the position of receiver aircraft 120. In doing so, processor 152 may analyze the position of receiver aircraft 120 for the future time (e.g., based on coordinates of aircrafts 110/120, the range of possible vectors with respect to supply aircraft 110 during approach/coupling via optical sensors 128, the relative position/angle of attachment of optical sensors 128 to receiver aircraft 120, etc.) to determine whether light from the sun at the future time would be incident on optical sensors 128 at a harmful angle.

In step 208, processor 152 generates a request for supply aircraft 110 to move to an alternate position for the future time. The alternate position may include any positional change (e.g., elevation, yaw, pitch, roll, etc.) from the typical, default, or planned position of supply aircraft 110. For instance, processor 152 may advantageously generate a request for supply aircraft 110 to adjust a predetermined flight path for the future time in response to a determination that optical sensors 128 of receiver aircraft 120 are susceptible to solar interference along the flight path. Processor 152 may also obtain from the calculation (e.g., performed in step 204) or calculate an adjustment value (e.g., change in elevation, angular direction, etc.) that avoids the solar interference at optical sensor 128. That is, processor 152 may determine an adjustment for supply aircraft 110 that causes a corresponding change to an angle of light from the sun 102 at the future time which would not be incident on optical sensors 128 at a harmful angle during a refueling operation. Processor 152 may provide information of the alteration to supply aircraft 110 such as adjustment value(s) and/or instructions for flight controller 114 and/or a flight crew to follow for maneuvering to the alternate position at the future time. Processor 152 may provide information of potential alteration(s) to a display of supply aircraft 110 and the display may optionally receive pilot input for selecting an alteration and confirming a change to the flight path.

In step 210, receiver aircraft 120 positions via optical sensors 128 at the future time with respect to the alternate position of supply aircraft 110 for the aerial fuel transfer. Thus, after confirmation of the alternate position and/or as supply aircraft 110 travels in the alternate position or an adjusted flight path, processor 152 may initiate the aerial fuel transfer. That is, processor 152 may authorize receiver aircraft 120 to proceed toward supply aircraft 110 for establishing fuel connection 118 at the future time. Using method 200, a determination of whether receiver aircraft 120 is able to successfully complete an aerial refueling operation may be made before the attempt to refuel begins. Furthermore, if there is a risk of solar interruption at the receiver aircraft 120 during the coupling process, a small, calculated adjustment to the flying position of supply aircraft 110 may allow receiver aircraft 120 to proceed with the refueling operation. The information calculated in method 200 may also be used to coordinate a deployment of receiver aircrafts 120 for refueling during a flight mission.

In one embodiment, mission planning station 130 includes processor 152 to implement method 200. In an example of such an embodiment, processor 152 may, prior to take-off of supply aircraft 110, analyze a predetermined flight path of supply aircraft 110 that includes a schedule of refuel operations for receiver aircrafts 120. Based on relative positions of the sun 102, supply aircraft 110, and receiver aircrafts 120 calculated for the flight path, processor 152 may, prior to mission start, provide options (e.g., alternative altitudes, bearings, etc.) for selection (e.g., via GUI) by flight crew of supply aircraft 110 that would avoid instances of sun glare on receiver aircraft(s) 120 in need of fuel.

In another embodiment, supply aircraft 110 includes processor 152 to implement method 200. In an example of such an embodiment, a flight crew of supply aircraft 110 may authorize a receiver aircraft 120 which has arrived unexpectedly or unscheduled at supply aircraft 110 for refueling. Processor 152 may use method 200 to make certain that sun glare will not impact receiver aircraft 120 during the time for receiver aircraft 120 to approach, refuel and leave. If processor 152 detect a dangerous period during an orbit of supply aircraft 110 in which an approaching receiver 120 would be exposed to sun glare, the flight crew of supply aircraft 110 is warned of the situation and provided with a recommended change. The command pilot of supply aircraft 110 may then maneuver supply aircraft 110 so the alignment among supply aircraft 110, receiver aircraft 120, and the sun is broken.

In yet another embodiment, receiver aircraft 120 includes processor 152 to implement method 200. In an example of such an embodiment, after a receiver aircraft 120 is notified of an assignment to a supply aircraft 110, processor 152 may retrieve the flight path, or orbit, of supply aircraft 110 (e.g., from mission planning station 130). Processor 152 may determine that some future portion of time for approaching/connecting to fuel connection 118 of supply aircraft 110 subjects optical sensors 128 of receiver aircraft 120 to glare. In response, processor 152 may request supply aircraft 110 to modify its orbit to avoid the glare.

Figure 3:
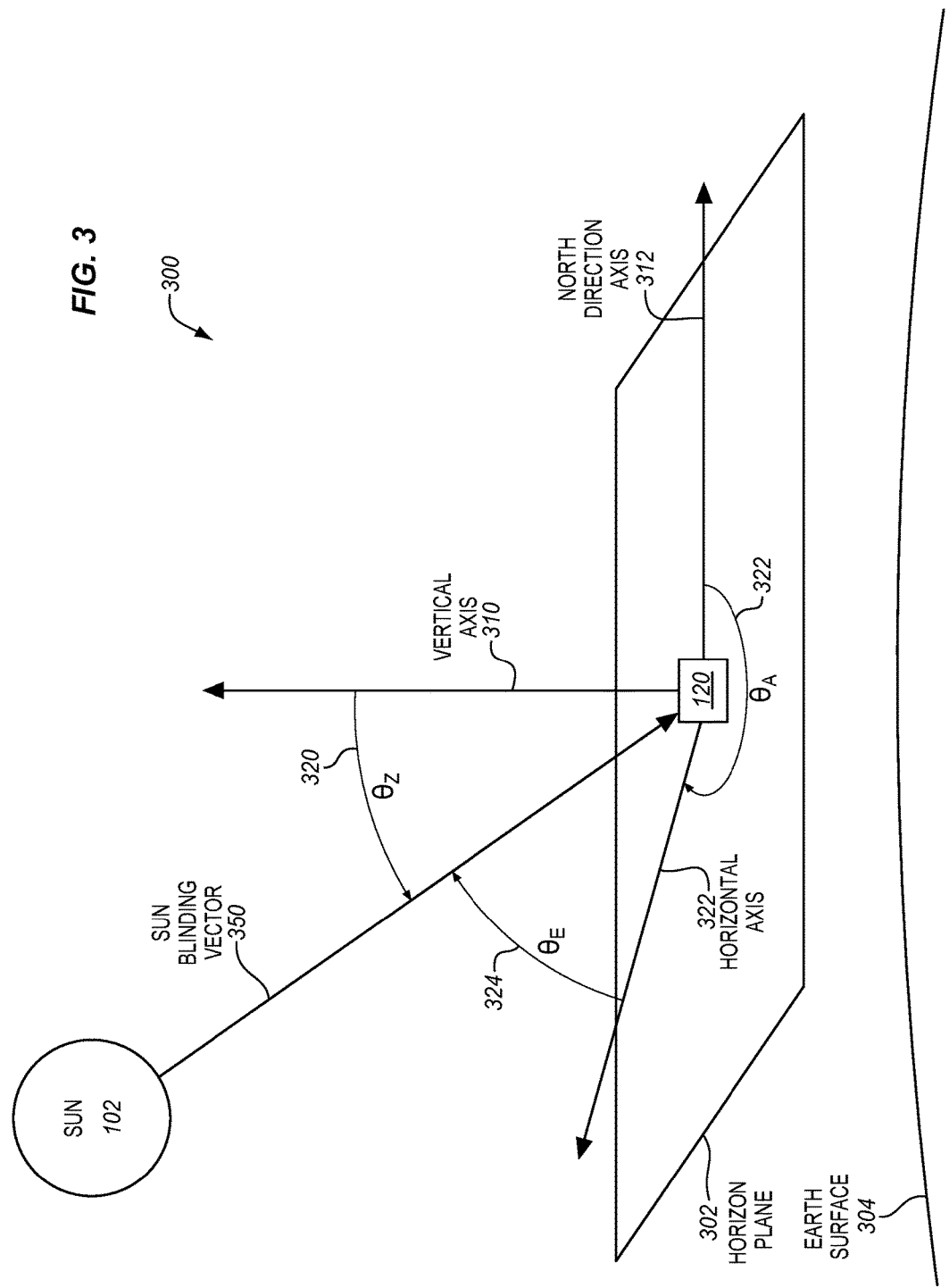
FIG. 3 is a diagram illustrating a relative position of a receiver aircraft and the sun with horizontal coordinates in an exemplary embodiment.

In solar glare prevention system 150, processor 152 may implement techniques for predicting an apparent position of the sun 102 at a point above earth's surface with a high degree of accuracy. FIG. 3 is a diagram 300 illustrating a relative position of receiver aircraft 120 and the sun 102 with horizontal coordinates in an exemplary embodiment. In horizontal coordinate notations, the observer (e.g., receiver aircraft 120) is at the origin of the coordinate system. As shown in diagram 300, a position of receiver aircraft 120 with respect to the sun 102 may be described with a horizontal plane 302 of receiver aircraft 120 above earth surface 304 in a vertical direction, a vertical axis 310, a north direction axis 312, and a horizontal axis 322 that extends in horizon plane 302 from receiver aircraft 120 toward a vector that extends from the sun 102 to the earth surface 304 parallel with vertical axis 310.

The angular position of receiver aircraft 120 with respect to the sun 102 may be defined by a topocentric zenith angle 320 (e.g., $\theta_Z$) which spans between the sun 102 and vertical axis 310, and a topocentric azimuth angle 322 (e.g., $\theta_A$) which spans along horizontal plane 302 from north direction axis 312 to horizontal axis 322 in a clockwise direction. A topocentric elevation angle 324 (e.g., $\theta_E$), which is similar to topocentric zenith angle 320 but spans from horizontal axis 322 rather than vertical axis 310, may also be used to define the angular position of receiver aircraft 120 with respect to the sun 102. By determining topocentric zenith angle 320 and topocentric azimuth angle 322, a sun blinding vector 350 may be defined which may cause solar interruption of optical sensors 128 on receiver aircraft 120 during an aerial refuel operation.

Existing techniques are capable of predicting an apparent solar position with respect to an object on earth surface 304 within accuracy of 0.01 degrees in solar zenith and azimuth angles. While this accuracy is sufficient for many applications, it may be inadequate for predicting solar glare on an optical sensor 128 of receiver aircraft 120. Moreover, while other existing techniques have improved the solar position calculation accuracy, such techniques are limited to objects on the Earth's surface and cannot be applied to an observer above earth surface 304, such as receiver aircraft 120 in-flight during an aerial refueling operation. As described in further detail below, processor 152 of solar glare prevention system 150 may determine azimuth/zenith angles with a calculation technique capable of predicting solar glare on an optical sensor 128 of receiver aircraft 120 with a high degree of accuracy (e.g., within 0.0003 degrees accuracy).

Figure 4:
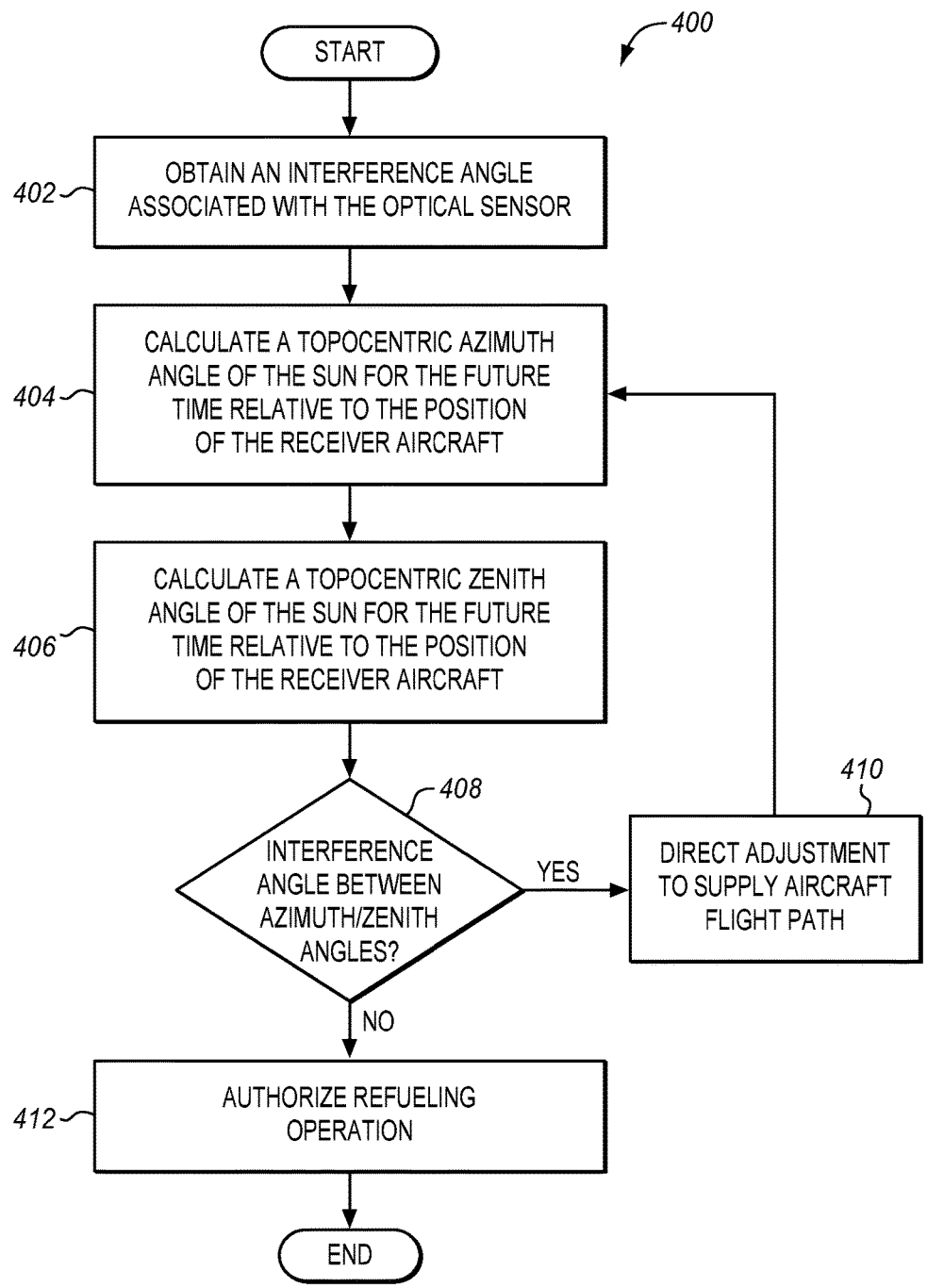
FIG. 4 is a flowchart of a method for predicting solar interference of a refueling aircraft with precise sun positioning calculations in an exemplary embodiment.

FIG. 4 a flowchart of a method 400 for predicting solar interference of a refueling aircraft with precise sun positioning calculations in an exemplary embodiment. The steps of method 400 will be described with reference to FIG. 1, but those skilled in the art will appreciate that method 400 may be performed in other systems.

In step 402, processor 152 obtains an interference angle associated with optical sensor(s) 128 of receiver aircraft 120 to be used for positioning receiver aircraft 120 in a future refueling operation. For instance, processor 152 may obtain solar glare information associated with optical sensor 128 that describes an interference angle, or range of angles, of light which interrupt the operation of optical sensors 128. Information of the interference angle may be communicated by mission planning station 130 or receiver aircraft 120 and/or stored in memory 154 of solar prevention system 150. The interference angle may, for example, be determined in advance according to prior testing of optical sensor 128, operational parameters of optical sensor 128, etc.

In step 404, processor 152 calculates a topocentric azimuth angle 322 of the sun 102 for a future time to position receiver aircraft 120 via one or more optical sensor(s) 128 with respect to supply aircraft 110 for an aerial fuel transfer. Processor 152 may calculate the topocentric azimuth angle 322 based on a topocentric declination of the sun 102 (e.g., an angular distance of the sun 102 with respect to earth's equator), a geographic latitude of receiver aircraft 120, and a topocentric hour angle of receiver aircraft 120 (e.g., angle between receiver aircraft 120 and the sun 102 in westward direction).

In step 406, processor 152 calculates a topocentric zenith angle 320 of the sun 102 for the future time to position receiver aircraft 120 via one or more optical sensor(s) 128 with respect to supply aircraft 110 for an aerial fuel transfer. Processor 152 may calculate the topocentric zenith angle 320 based at least in part on the topocentric azimuth angle 322 calculated in step 404. Prior solar position prediction techniques calculate the zenith angle before calculating the azimuth angle. By calculating the topocentric azimuth angle 322 first, processor 152 is able to convert position data centered upon the sun 102 to apparent position data centered upon receiver aircraft 120, and is further able to correct for irregular effects, as described in greater detail below.

In step 408, processor 152 determines whether the topocentric azimuth angle 322 and the topocentric zenith angle 320 define a vector to receiver aircraft 120 that overlaps with the interference angle. That is, the topocentric azimuth angle 322 and topocentric zenith angle 320 define a forbidden direction (e.g., sun blinding vector 350) from receiver aircraft 120 to supply aircraft 110 during a refueling operation that would result in blinding optical sensors 128. If processor 152 determines that the sun 102 would interfere with optical sensors 128 for refueling operation at the future time (e.g., yes in step 408), method 400 may proceed to step 410. In step 410, processor 152 directs an adjustment to the flight path of supply aircraft 110 and repeats steps 404-408 as necessary, obtaining new values based on the change in flight path of supply aircraft 110. Otherwise, method 400 may proceed to step 412 where processor 152 authorizes the refueling operation.

Figure 5:
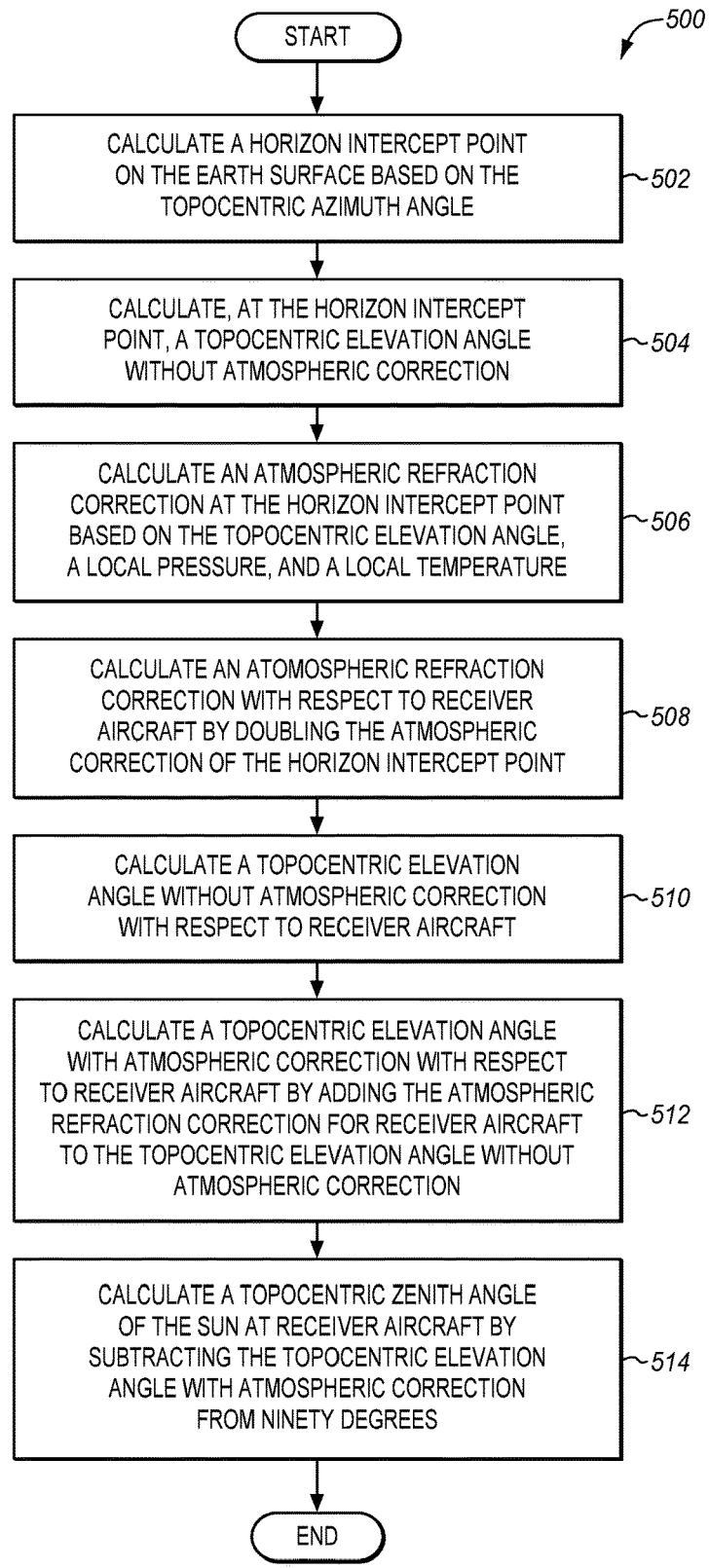
FIG. 5 is a flowchart of a method for calculating a topocentric zenith angle of the sun in an exemplary embodiment.

FIG. 5 a flowchart of a method 500 for calculating a topocentric zenith angle 320 of the sun 102 in an exemplary embodiment. The steps of method 500 will be described with reference to FIG. 1, but those skilled in the art will appreciate that method 500 may be performed in other systems.

As described earlier, by calculating the topocentric azimuth angle 322 first, processor 152 is able to convert position data centered upon the sun 102 to apparent position data centered upon receiver aircraft 120, and is further able to correct for irregular effects. Irregular effects include the oblateness of the earth, variations in the earth's rotation caused by tides, variations in the earth's orbit caused by the moon, variations in the earth's orbit caused by large planets, and variations in the apparent position of the Sun caused by the earth's atmosphere.

In step 502, processor 152 calculates a horizon intercept point on earth surface 304 based on the topocentric azimuth angle 322 of the sun 102 (e.g., calculated in step 404), an altitude of the observer, the oblateness of the earth, and the elevation along the azimuth angle of earth's surface features (e.g., to account for highlands causing the horizon intercept point to be closer to the observer than it would be if the earth were smooth). The horizon intercept point is a point on earth surface 304 at which a view from receiver aircraft 120 in a direction of the topocentric azimuth angle 322 intercepts the earth's horizon.

In step 504, processor 152 calculates, at the horizon intercept point, a topocentric elevation angle without atmospheric correction. Processor 152 may calculate such based on the geographical latitude, the topocentric hour angle, and the topocentric declination of the sun 102. The allowable range of values for this result is −50 arcminutes to 90 degrees. The lower limit of −50 arcminutes is due to −16 arcminutes potentially being introduced because any point on the surface of the sun 102 is bright enough to blind aircraft sensors 128 (e.g., not just the center of the sun which is typically used for positional calculations), and thus the angular radius of the sun 102 (which is 16 arcminutes) is taken into account for when the upper limb of the Sun is at the horizon as the center of the sun 102 is below the horizon.

The remaining 34 arcminutes may be introduced due to refraction of the light of the sun 102 by the earth's atmosphere.

In step 506, processor 152 calculates an atmospheric refraction correction at the horizon intercept point based on the topocentric elevation angle, a local pressure, and a local temperature. Processor 152 may use an average local pressure for the month and the average local temperature for the month for an accurate calculation of atmospheric refraction correction.

In step 508, processor 152 calculates an atmospheric refraction correction with respect to receiver aircraft 120 by doubling the atmospheric correction of the horizon intercept point. The light of the sun 102 travelling to an observer is refracted by the atmosphere as it travels into the atmosphere and toward the horizon intercept point, and is refracted again when it passes the horizon intercept point and continues on toward the elevated observer (e.g., receiver aircraft 120). The second refraction is slightly smaller than the first due to the observer being in an atmosphere rather than space, but a factor of two is accurate because most of the refraction happens in the lowest parts of the atmosphere. Furthermore, a factor of two provides a margin of protection to optical sensors 128 since it may be a slight overestimate.

In step 510, processor 152 calculates a topocentric elevation angle without atmospheric correction with respect to receiver aircraft 120. Processor 152 may calculate such based on the observer's geographical latitude, the observer's topocentric hour angle, and the observer's topocentric declination of the Sun. The lower allowable limit for this value may be negative and the magnitude may be equal to the angle subtended by the observer from horizontal down to the horizon intercept point.

In step 512, processor 152 calculates a topocentric elevation angle with atmospheric correction with respect to receiver aircraft 120 by adding the atmospheric refraction correction (e.g., calculated in step 508) to the topocentric elevation angle without atmospheric correction (e.g., calculated in step 510). And, in step 514, processor 152 calculates a topocentric zenith angle 320 of the sun 102 at receiver aircraft 120 by subtracting the topocentrical elevation angle with atmospheric correction (e.g., calculated in step 512) from ninety degrees. With the topocentrical zenith angle 320 determined in such a manner, processor 152 may predict solar glare of optical sensors 128 on receiver aircraft 120 using positional calculations accurate within 0.0003 degrees.

Any of the various control elements (e.g., electrical or electronic systems/components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method comprising:
    calculating a future time to position a receiver aircraft via an optical sensor with respect to a supply aircraft for an aerial fuel transfer;
    calculating a sun position relative to the position of the receiver aircraft for the future time;
    determining that the optical sensor of the receiver aircraft is susceptible to solar interference for the future time based on the sun position relative to the position of the receiver aircraft;
    generating a request for the supply aircraft to move to an alternate position for the future time; and
    positioning the receiver aircraft via the optical sensor at the future time with respect to the alternate position of the supply aircraft for the aerial fuel transfer.

2. The method of claim 1 further comprising:
    determining that the optical sensor of the receiver aircraft is susceptible to solar interference by:
        obtaining an interference angle associated with the optical sensor;
        calculating a topocentric azimuth angle of the sun for the future time relative to the position of the receiver aircraft;
        calculating a topocentric zenith angle of the sun for the future time relative to the position of the receiver aircraft; and
        determining whether the topocentric azimuth angle and the topocentric zenith angle define a vector to the receiver aircraft that overlaps with the interference angle.

3. The method of claim 2 further comprising:
    calculating the topocentric zenith angle by:
        calculating a horizon intercept point on earth surface based on the topocentric azimuth angle;
        calculating a topocentric elevation angle of the sun at the horizon intercept point;
        calculating an atmospheric refraction correction at the horizon intercept point based on the topocentric elevation angle;
        calculating an atmospheric refraction correction with respect to the receiver aircraft by doubling the atmospheric refraction correction at the horizon intercept point;
        calculating a corrected topocentric elevation angle of the sun with atmospheric correction with respect to the receiver aircraft by adding the atmospheric refraction correction for the receiver aircraft to the topocentric elevation angle; and calculating the topocentric zenith angle of the sun at the receiver aircraft by subtracting the corrected topocentric elevation angle from ninety degrees.

4. The method of claim 1 further comprising:
calculating the future time to position the receiver aircraft for the aerial fuel transfer based at least in part on a flight path for the supply aircraft to follow;
generating a request for the supply aircraft to adjust the flight path for the future time in response to a determination that the optical sensor of the receiver aircraft is susceptible to solar interference along the flight path; and
initiating the aerial fuel transfer as the supply aircraft travels in an adjusted flight path.

5. The method of claim 1 further comprising:
calculating the future time to position the receiver aircraft based on a calculated span of time between initiating use of the optical sensor for the aerial fuel transfer and ending use of the optical sensor for the aerial fuel transfer.

6. The method of claim 1 further comprising:
calculating the sun position relative to the position of the receiver aircraft based on a positional constraint for connecting the receiver aircraft with the supply aircraft for the aerial fuel transfer.

7. The method of claim 1 wherein:
the receiver aircraft is an unmanned aerial vehicle.

8. A non-transitory computer readable medium embodying programmed instructions which, when executed by a processor, are operable for performing a method comprising:
calculating a future time to position a receiver aircraft via an optical sensor with respect to a supply aircraft for an aerial fuel transfer;
calculating a sun position relative to the position of the receiver aircraft for the future time;
determining that the optical sensor of the receiver aircraft is susceptible to solar interference for the future time based on the sun position relative to the position of the receiver aircraft;
generating a request for the supply aircraft to move to an alternate position for the future time; and
positioning the receiver aircraft via the optical sensor at the future time with respect to the alternate position of the supply aircraft for the aerial fuel transfer.

9. The medium of claim 8 wherein the method further comprises:
determining that the optical sensor of the receiver aircraft is susceptible to solar interference by:
obtaining an interference angle associated with the optical sensor;
calculating a topocentric azimuth angle of the sun for the future time relative to the position of the receiver aircraft;
calculating a topocentric zenith angle of the sun for the future time relative to the position of the receiver aircraft; and
determining whether the topocentric azimuth angle and the topocentric zenith angle define a vector to the receiver aircraft that overlaps with the interference angle.

10. The medium of claim 9 wherein the method further comprises:
calculating the topocentric zenith angle by:
calculating a horizon intercept point on earth surface based on the topocentric azimuth angle;
calculating a topocentric elevation angle of the sun at the horizon intercept point;
calculating an atmospheric refraction correction at the horizon intercept point based on the topocentric elevation angle;
calculating an atmospheric refraction correction with respect to the receiver aircraft by doubling the atmospheric refraction correction at the horizon intercept point;
calculating a corrected topocentric elevation angle of the sun with atmospheric correction with respect to the receiver aircraft by adding the atmospheric refraction correction for the receiver aircraft to the topocentric elevation angle; and
calculating the topocentric zenith angle of the sun at the receiver aircraft by subtracting the corrected topocentric elevation angle from ninety degrees.

11. The medium of claim 8 wherein the method further comprises:
calculating the future time to position the receiver aircraft for the aerial fuel transfer based at least in part on a flight path for the supply aircraft to follow;
generating a request for the supply aircraft to adjust the flight path for the future time in response to a determination that the optical sensor of the receiver aircraft is susceptible to solar interference along the flight path; and
initiating the aerial fuel transfer as the supply aircraft travels in an adjusted flight path.

12. The medium of claim 8 wherein the method further comprises:
calculating the future time to position the receiver aircraft based on a calculated span of time between initiating use of the optical sensor for the aerial fuel transfer and ending use of the optical sensor for the aerial fuel transfer.

13. The medium of claim 8 wherein the method further comprises:
calculating the sun position relative to the position of the receiver aircraft based on a positional constraint for connecting the receiver aircraft with the supply aircraft for the aerial fuel transfer.

14. The medium of claim 8 wherein:
the receiver aircraft is an unmanned aerial vehicle.

15. A system comprising:
a supply aircraft configured to receive instructions that indicate a flight path for the supply aircraft to follow, and to transfer fuel in-flight to an unmanned air vehicle in an aerial refuel operation; and
a processor configured to determine that the flight path exposes an optical sensor of the unmanned air vehicle to solar interference during the aerial refuel operation based on a calculation of a sun position relative to the unmanned air vehicle for the flight path, and to generate a message to display on a display of the supply aircraft an indication to adjust the flight path for the aerial refuel operation.

16. The system of claim 15 wherein:
the processor is further configured to obtain an adjustment value for the flight path based on the calculation, and to provide the adjustment value to the display of the supply aircraft.

17. The system of claim 16 wherein:
the supply aircraft includes a boom that connects with the unmanned air vehicle for the aerial refuel operation.

18. The system of claim 15 wherein:
the supply aircraft includes the processor.

19. The system of claim 15 wherein:
the processor is on-board the unmanned air vehicle.

20. The system of claim 15 wherein:
the processor is implemented in a ground system that manages the aerial refuel operation between the supply aircraft and the unmanned air vehicle.

* * * * *